United States Patent [19]

Stover

[11] Patent Number: 4,579,048

[45] Date of Patent: Apr. 1, 1986

[54] BEVERAGE BREWING APPARATUS

[75] Inventor: Kenneth W. Stover, Springfield, Ill.

[73] Assignee: Bunn-O-Matic Corporation, Springfield, Ill.

[21] Appl. No.: 559,927

[22] Filed: Dec. 9, 1983

Related U.S. Application Data

[60] Continuation-in-part of Ser. No. 528,859, Sep. 1, 1983, which is a division of Ser. No. 317,140, Nov. 2, 1981, abandoned, which is a continuation-in-part of Ser. No. 75,601, Sep. 14, 1979, Pat. No. 4,303,525, and Ser. No. 108,590, Dec. 31, 1979, Pat. No. 4,309,939, which is a continuation-in-part of Ser. No. 75,601.

[51] Int. Cl.$^4$ .............................................. A47J 31/00
[52] U.S. Cl. ...................................... 99/280; 99/295; 99/307
[58] Field of Search ................ 99/295, 279, 306, 316, 99/323, 280, 281, 282, 283, 298, 304, 305, 316, 307; 426/433

[56] References Cited

U.S. PATENT DOCUMENTS

| | | | |
|---|---|---|---|
| 3,408,921 | 11/1968 | Freese | 99/295 |
| 3,425,338 | 2/1969 | Vittoe | 99/295 |
| 4,147,097 | 4/1979 | Gregg | 99/305 |
| 4,207,809 | 6/1980 | Brill | 99/279 |

Primary Examiner—Robert W. Jenkins
Attorney, Agent, or Firm—Lockwood, Alex, FitzGibbon & Cummings

[57] ABSTRACT

Fully automatic brewing apparatus is disclosed for economically and efficiently making large quantities of beverage. Beverage concentrate is first brewed from a dry, beverage-making material, such as tea leaves contained in a brewing funnel which, in one embodiment may be pivoted for emptying the concentrate into a selected one of a pair of relatively large reservoirs. The concentrate is automatically diluted to acceptable strength and temperature by the timed addition of water to the reservoir in a stream which provides complete mixing of the concentrate with the diluting water.

30 Claims, 11 Drawing Figures

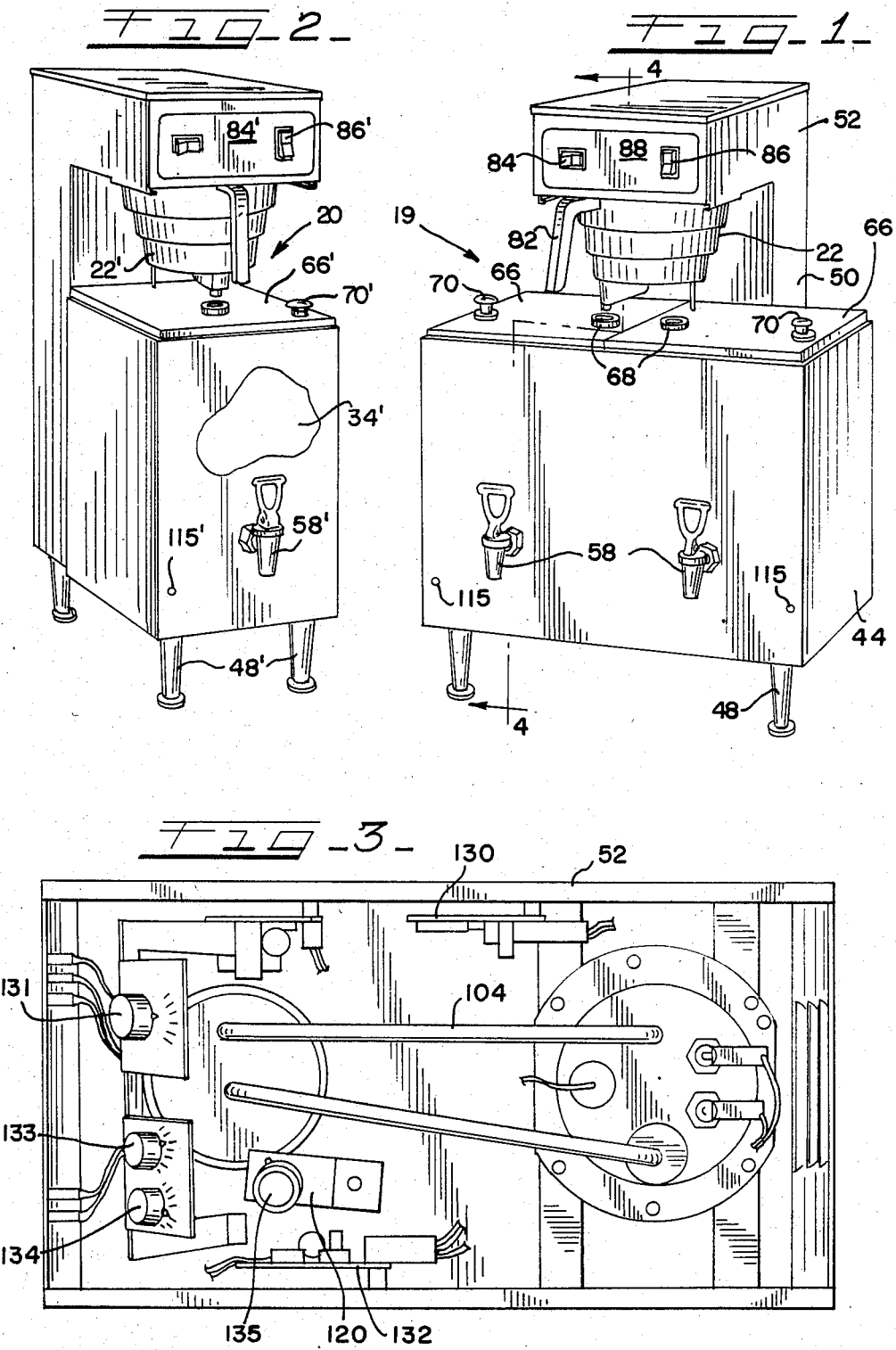

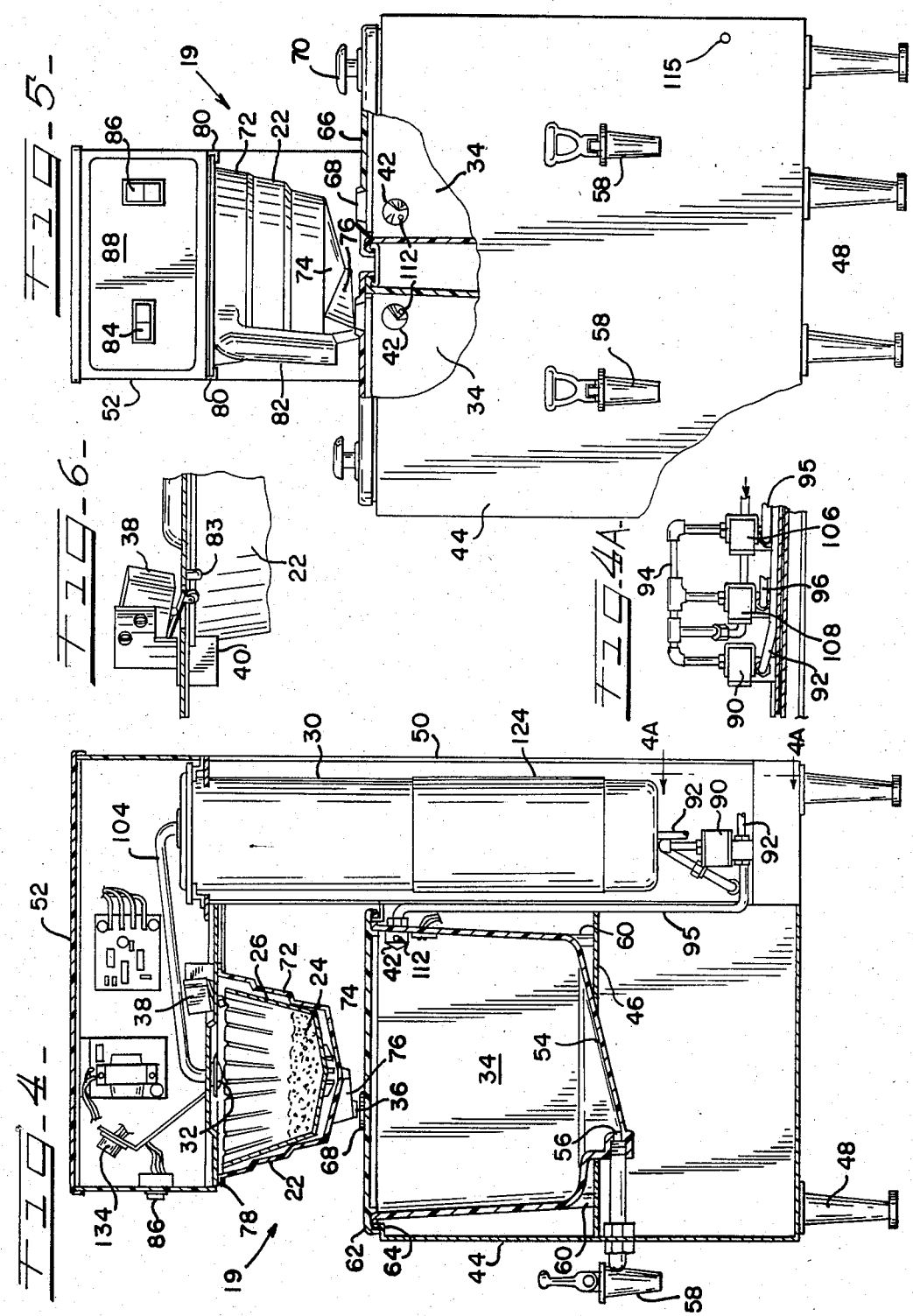

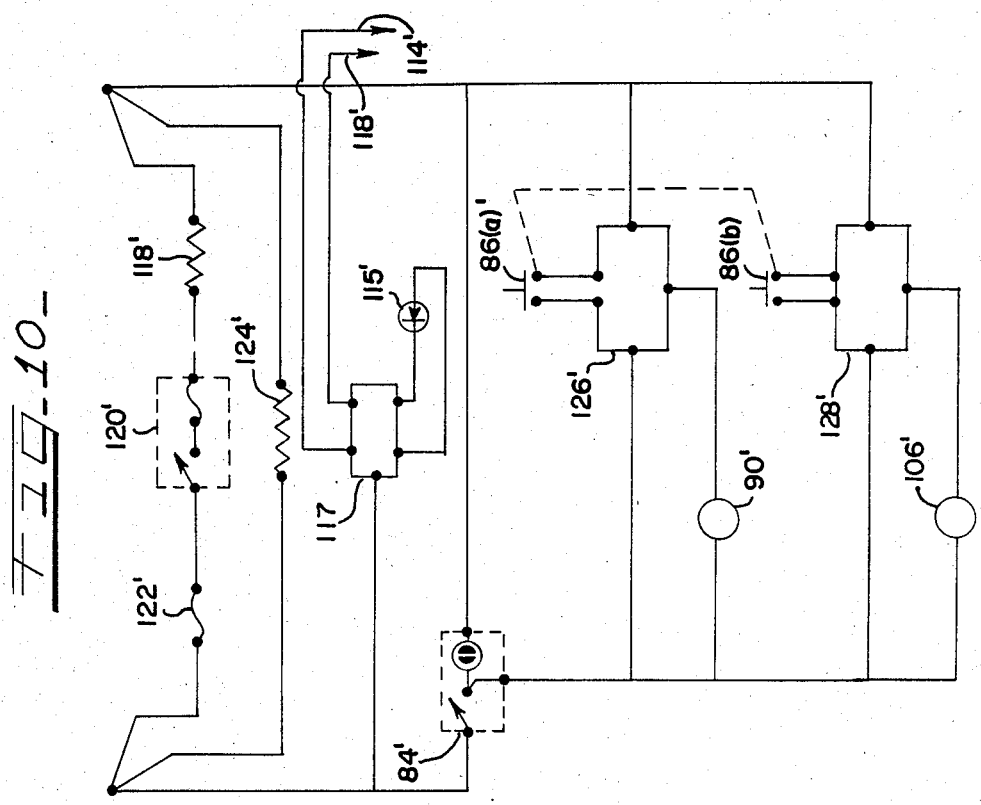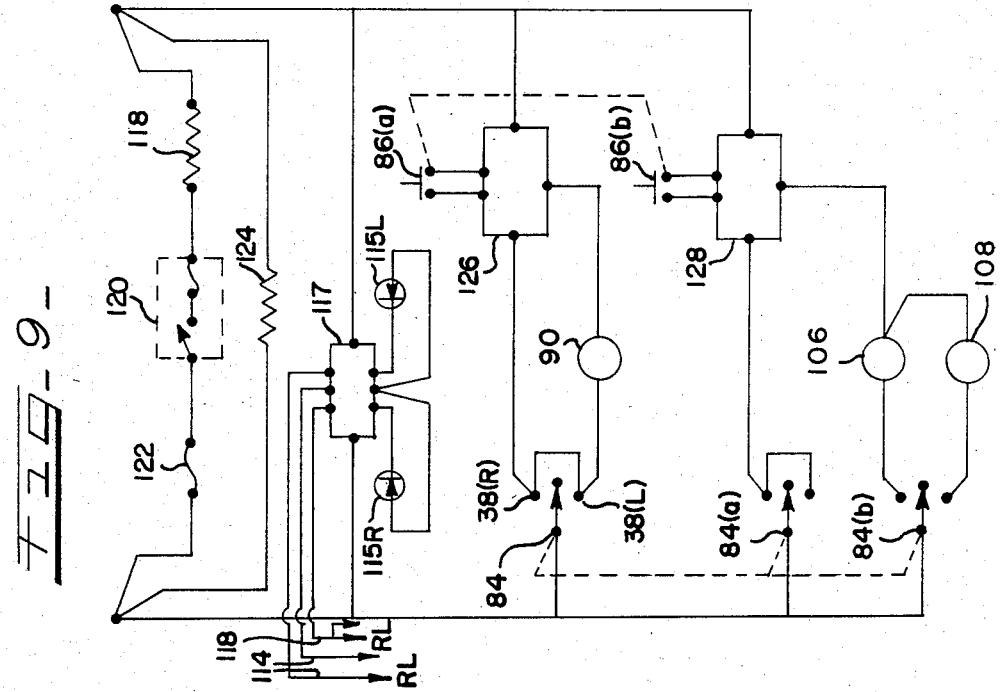

BEVERAGE BREWING APPARATUS

This application is a continuation-in-part of my copending application Ser. No. 06/528,859, filed Sept. 1, 1983, which is a division of my prior application, Ser. No. 06/317,140 filed Nov. 2, 1981, now abandoned, which in turn was a continuation-in-part of my prior application Ser. No. 075,601 filed Sept. 14, 1979, now Pat. No. 4,303,525 dated Dec. 1, 1981 and of my prior application Ser. No. 108,590 filed Dec. 31, 1979 now Pat. No. 4,309,939 dated Jan. 12, 1982, which latter application was a continuation-in-part of application Ser. No. 075,601 filed Sept. 14, 1979 now U.S. Pat. No. 4,303,525 dated Dec. 1,1981.

The present invention relates generally to apparatus for making beverages and, more particularly, to apparatus for brewing beverages such as tea, coffee and the like.

Equipment for brewing beverages such as coffee and the like have, prior to the inventions disclosed in my above-identified prior applications and patents, typically been of the "single station" type, in which an empty carafe or pot is positioned on a heating element below a receptacle or brewing funnel which contains a measured quantity of dry beverage-making material, e.g. ground coffee. Hot water is then passed through the material to extract the essential oils, flavor and body that make up the beverage, and then drains downwardly through an opening in the funnel into the pot or carafe. If and when a second pot or carafe of beverage is needed, the first must be moved to a separate heating element or plate. Although such prior beverage brewers work satisfactorily for making relatively small quantities of beverage, in restaurants and other commercial and institutional establishments, there is a continuing need for equipment to make large quantities of beverages, especially iced tea, which is easy to use and relatively automatic so as not to require an unreasonable amount of personal attention during the brewing cycle.

The needs of restaurants, institutions and other commercial establishments are of particular concern in regard to equipment for brewing and making iced tea. Most prior brewing equipment has been specifically designed for making coffee, which does not have the same brewing requirements as tea. For example, brewing tea requires a relatively lengthy period of "steeping" to extract the full flavor and bouquet from the tea leaves. Compared to the steeping time for tea, the time required to extract full coffee flavor from ground coffee is very small, and coffee brewers are designed to pass hot water through the ground coffee with very little delay. Also, in making tea, the extract from the steeping operation will be too strong for regular consumption and must be diluted, whereas the extract from typical coffee brewers is ready for consumption immediately. Accordingly, many restaurants, institutions and other commercial establishments have resorted to the use of instant tea, which does not have the full flavor or body of brewed tea, or to tea bags which are relatively expensive and not convenient from the customer's standpoint.

Accordingly, it is a general object of the present invention to provide improved apparatus for brewing beverages, particularly iced tea.

It is a further object of the present invention to provide brewing apparatus for making relatively large quantities of beverages, especially tea, which is easy to use, and requires only a small amount of personal attention.

It is another object of the present invention to provide such brewing apparatus which is particularly useful for brewing tea in large, commercial or institutional quantities.

Still another important object of the invention is the provision of apparatus for brewing beverages which is comparable in function and capability to the beverage brewing apparatus disclosed in my prior above-identified applications and patents but which is less costly to produce in that it does not require a fill and dump basin and its associated parts.

These and other objects of the present invention are set forth more clearly and fully in the following detailed description of two preferred embodiments of the present invention shown and described in connection with the attached drawings, in which:

FIG. 1 is a perspective view of a two-reservoir beverage brewing apparatus forming one embodiment of the present invention.

FIG. 2 is a perspective view of a single reservoir beverage brewing apparatus forming a second embodiment of the present invention.

FIG. 3 is a top plan view of the interior of the top compartment of the apparatus of the embodiment of FIG. 1 with the top panel removed.

FIG. 4 is a vertical sectional view along line 4—4 of FIG. 1 with certain components shown in side elevation.

FIG. 4A is a fragmentary view taken on line 4A—4A of FIG. 4.

FIG. 5 is front elevational view of the apparatus shown in FIG. 1 with portions of the housing removed to show additional aspects and components of the present invention.

FIG. 6 is an enlarged fragmentary detail sectional view of one of two position switches on the beverage making apparatus of FIG. 1 cooperative with the brewing funnel thereof.

FIG. 9 is an electrical schematic of the control system of the brewing apparatus of FIG. 1.

FIG. 10 is an electrical schematic of the control system of the brewing apparatus of FIG. 2.

Figure 7:
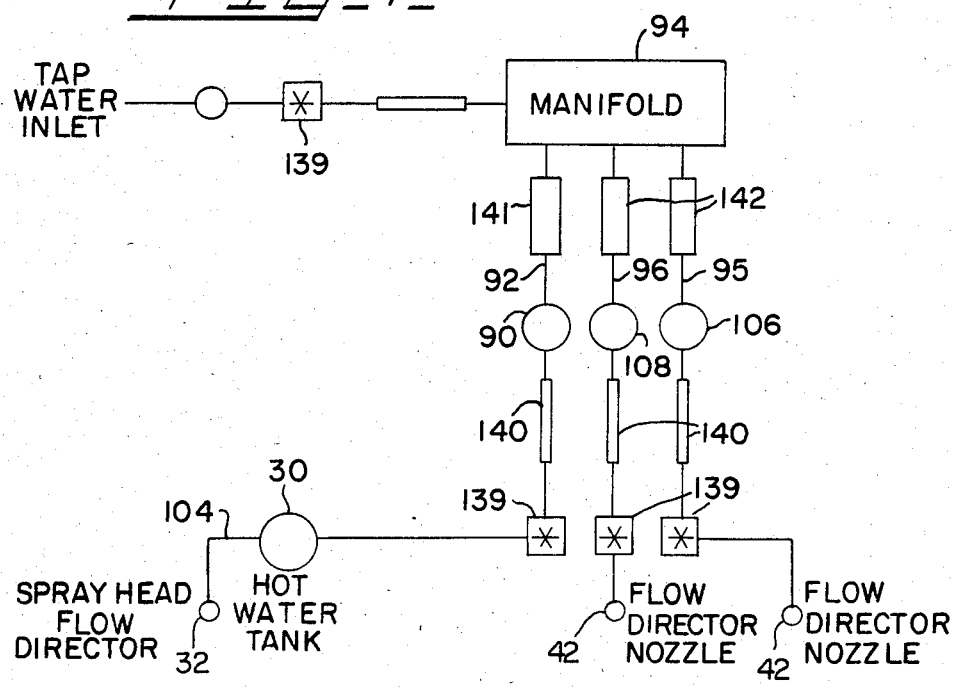
FIG. 7 is a schematic diagram of the fluid flow system embodied in the apparatus of FIG. 1.

The present invention is generally embodied in the beverage brewing apparatus indicated generally at 19 and 20 in FIGS. 1 and 2, respectively, and particularly suited for making tea for use as iced tea. As readily seen from the apparatus as shown in FIG. 4, by passing a measured amount of near-boiling water through a brewing funnel 22 which contains a quantity of ground tea leaves 24 within a paper filter 26, a concentrate of brewed tea is produced which discharges into a relatively large capacity reservoir indicated generally at 34. In respect to the brewing function per se, the apparatus 19 of FIG. 1 and 20 of FIG. 2 operate in accordance with the principles disclosed in Pat. No. 3,034,417 dated May 15, 1962 issued to George R. Bunn. That is to say, a measured quantity of cold water is introduced into the lower portion of a hot water tank 30 thereby displacing an equal measured quantity of hot water from the upper portion of the tank or reservoir which is discharged through a spray head 32 into the brewing funnel 22.

The brewing apparatus 19 of FIG. 1 is especially applicable and efficient for making large quantities of beverages, particularly iced tea, as may be needed, for example, in restaurants or cafeterias. Referring to FIG. 5, the brewing apparatus 19 has a pair of large adjacent reservoirs 34—34 mounted below and on either side of the spray head 32 (FIG. 4). The brewing funnel 22 is pivotally mounted on the apparatus and has an off-center discharge opening 36 (FIG. 4) which may be rotated to discharge into either of the reservoirs 34. This arrangement permits beverage to be dispensed from one of the reservoirs 34 at the same time that fresh beverage is being brewed and made in the other reservoir 34. As a safety feature to prevent the brewing cycle from beginning unless the funnel 22 is properly positioned over one of the reservoirs 34, the control circuitry of the brewing apparatus 20 includes a pair of angularly-spaced contact switches 38 (FIGS. 4 and 6) mounted to engage a tab 40 on the top of funnel 22 only when the latter is properly positioned over one of the reservoirs.

For brewing tea or other beverages which are steeped or otherwise produce a beverage concentrate which must be diluted before serving, each reservoir 34 has a volume substantially larger than the volume of hot water passing through the funnel 22 during each brewing cycle, and the apparatus 19 includes completely automatic dilution means for adding tap water to each reservoir 34 so as to dilute the concentrate to the proper strength. Preferably, the dilution water is directed, via flow director 42 (FIG. 5), against an adjacent wall of the reservoir to reduce foaming and improve mixing, and is timed to begin after beverage concentrate begins to flow into the reservoir from the funnel 22 and to continue until after the flow of concentrate is substantially complete. Steeping of the beverage in the illustrated brewing apparatus 19 and 20 is provided by making the discharge opening 36 of the funnel 22 sufficiently small or restricted so that the hot water flowing from the spray head 34 accumulates in the funnel 22 wherein a large portion of it remains for most of the desired period of steeping.

Turning now to a more detailed description of the embodiment of the present invention shown in FIG. 1, the body of the brewing apparatus 19 is generally formed of aluminum and/or stainless steel sheet metal construction for strength, weight saving and ease of cleaning. Although the specific shape of the housing may be changed for different aesthetic effects, the illustrated housing has a generally rectangular base portion 44 which defines an upper hollow well or chamber which receives and encloses the reservoirs 34. As seen from FIG. 4, the reservoirs 34 rest on an interior horizontal partition plate 46 which also serves to define the top of a lower chamber in the base portion 44 in which the fluid control system for the brewing apparatus 19 is mounted. The base portion 44 is mounted on legs 48 for resting on a flat surface such as a countertop or table.

As seen from FIGS. 1 and 4, the housing of the brewing apparatus 19 has a rear upstanding portion 50 which is carried by the base portion 44 and which encloses the upright hot water tank or reservoir 30, and an upper cabinet 52, a portion of which is cantilevered outwardly from the rear portion so as to overhang the reservoirs 34 and which contains the electrical control components of the apparatus, particularly the ones that require initial setting and resetting from time to time.

Returning to the base portion 44 (FIGS. 4 and 5), the reservoirs 34 are preferably of generally rectangular shape, open at the top to receive beverage concentrate from the brewing funnel 22. Bottom wall 54 of each reservoir slopes downwardly, through an opening in the horizontal partition plate 46, toward a reservoir outlet 56 which is threadedly attached to the inlet pipe of a typical beverage dispensing faucet 58 mounted on the front panel of the base portion.

Although they may be made from other materials, each reservoir 34 is preferably of one-piece molded plastic construction, with downwardly extending feet 60 at the front and back for resting atop the partition plate 46 in the base portion 44. A downturned flange or edge 62 is provided around the top edge of each reservoir 34 so as to receive and rest on an upwardly extending flange 64 around the open well in the base portion and into which each reservoir is inserted.

To keep dust and foreign material from falling into the reservoirs 34, each has a removable plastic cover 66. Each cover 66 has a relatively small opening 68 located therein so as to correspond to the proper positioning of the off-center discharge opening 36 of the funnel 22 for that particular reservoir, so that beverage concentrate from the outlet opening 36 will discharge by gravity from the funnel directly into the selected reservoir while the cover 66 is in place. Because the relative discharge positions for the funnel 22 over each reservoir 34 are not the same, the covers 66 are not interchangeable but left-handed and right-handed whereby the opening 68 in the cover for one reservoir 34 will not be in the proper position to receive beverage concentrate if placed on the other reservoir, and vice versa. To prevent accidentally spilling the very hot concentrated beverage because a cover 66 is misplaced on one of the reservoirs, each cover has a multi-purpose handle 70 which, in addition to providing means to grip and manipulate the cover, is located so that in case a cover is placed on the wrong reservoir, the handle 70 will prevent the funnel 22 from being rotated into a position for discharge into that reservoir.

As noted above, funnel position switches 38 connected to the brewer control circuit prevent the brewing cycle from starting unless the funnel 22 is properly positioned over one of the openings 68. This may be better understood by reference to FIG. 5 and visualizing that the cover 66 shown on the right-hand reservoir 34 is placed on the left-hand reservoir. In that event, the handle 70 would then be in a position where the opening 68 would normally be, and would abut the wall of the discharge opening 36 in the bottom of the funnel 22 and prevent proper positioning to close the associated switch 38. Although, the multi-purpose handles 70 work satisfactorily to prevent accidental spillage, the cover 66 could also employ other upstanding stops, in place of or in addition to the handle 70, to block rotation of the funnel 22 over a reservoir on which the wrong cover 66 has been placed.

The brewing funnel 22 which is preferably employed with the brewing apparatus 19 of the present invention is best shown in FIGS. 1, 4 and 5. It has a generally inclined, stepped side wall 72 which tapers inwardly to a bottom wall 74 that includes a radial channel 76 communicating with the off-centered discharge opening 36. The top of the funnel is open to receive hot water from the spray head 32 and has a generally radially extending rim or flange 78 (FIG. 4) for insertion between a pair of slotted inwardly facing rails 80 (FIG. 5) on the underside of the upper cabinet 52 of the brewing apparatus. The sliding receipt of the rim within the rails also permits the funnel 22 to be rotated or pivoted between either of two positions where the off-center discharge portion and opening 36 is located over one or the other of the openings 68 in one or the other of the reservoirs 34. Additional details of the construction of the funnel 22 are set forth in my above-mentioned Pat. No. 4,303,525 dated Dec. 1, 1981, the disclosure of which is hereby incorporated by reference.

As mentioned above, the brewer 19 includes a pair of switches 38 (FIGS. 4 and 6) to prevent operation of the brewing cycle unless the funnel 22 is properly positioned to discharged concentrate into one or the other of the reservoirs 34. The earlier mentioned tab 40 on the funnel 22 extends generally radially outward from the rim 78, 180° opposite the funnel handle 82, and the switches 38 are spaced apart at different angular positions so as to be engaged by the tab when the discharge opening 36 is properly positioned over one or the other of the reservoirs 34. Thus, the handle 82, which is located immediately outwardly of the funnel discharge opening 36 provides a visual indication of the proper positioning of the funnel and the tab 40 in conjunction with the switches 38 and provides a mechanical-electrical indication of proper positioning. Referring to FIG. 6, the switches 38 are mounted on the upper portion 52 of the housing with roller cam actuators positioned for contact with the tab 40 when the funnel 22 is properly positioned. A stop 83 on the underside of the upper portion 52 adjacent to each switch 38 prevents rotation of the funnel beyond either of the desired positions. Detent means (not shown) may be provided in cooperation with each stop 83 to prevent "bounce back" of the funnel 22 after it engages one of the stops. It will be understood that the switches 38 can be of any suitable mechanical, electrical, magnetic or electronic switch of known type.

The first step in brewing a quantity of tea concentrate or the like is the loading of the funnel 22 with a measured quantity of material for the beverage to be brewed. For example, for tea, a quantity of ground tea leaves may be emptied into the paper filter 26 which lines the interior of the funnel 22, or the tea leaves may be pre-packaged in a filter container or bag for loading into the funnel—this may even include placing a number of tea bags of the type currently available on the market into the funnel. The funnel 22 is then inserted into the rails 80 underneath the spray head 32 on the underside of the cabinet 52 and rotated so as to position the off-center discharge opening 36 over the selected reservoir 34. Proper manual positioning of the funnel 22 causes the funnel tab 40 to engage and close one of the cam operated interlock switches 38 to permit the brewing cycle to start. The operator then moves a selector switch 84 (FIG. 5) to the reservoir chosen and momentarily presses a start switch 86, both of which are mounted on the front panel 88 of the upper cabinet or housing 52. By pressing the start switch 86, the operator energizes an electrical circuit which will be discussed more fully below, which automatically controls the flow of brewing and dilution water in the apparatus.

Referring to FIG. 7, which is a plumbing diagram for the brewer apparatus 19, and also to FIGS. 4 and 4A, the brewing cycle begins by the opening of an electrical solenoid valve 90 in water line 92 which extends from an inlet water manifold 94 to the lower portion of the hot water tank 30 housed in the upstanding portion 50. The solenoid valve 90 remains open until automatically closed by an electrically controlled timer after having allowed a selected quantity of cold water, typically more than one-half (½) gallon to flow into the hot water tank 30. For brewing tea, with a reservoir 34 of about three (3) gallons capacity, the preferred quantity of cold water input is approximately 0.6 gallon. Of this amount, approximately 0.1 gallon will be retained by the tea leaves. Thus, it requires 76 oz. of hot water to yield 64 oz. of concentrate, with 12 oz. being retained in the funnel. As mentioned above, the measured quantity of cool or cold tap water entering the bottom of the hot water tank 30 displaces an equal quantity of the hottest water adjacent the upper end of the tank which in turn discharges through the hot water outlet conduit 104 interconnecting the top of the hot water tank to the spray head 32 positioned over the brewing funnel 22.

As noted earlier, to provide the steeping action necessary to extract the essential oils, flavors, body bouquet and the like from the tea or other beverage producing product contained in the funnel 22, the spray head 32 is sized to discharge the hot water into the funnel at a relatively rapid rate compared to the rate at which the beverage concentrate discharges through the outlet opening 36 of the funnel which is relatively small so that hot water accumulates and remains in the funnel during steeping. As a safety measure in the event of stoppage of the discharge opening 36 the funnel 22 should have a capacity to hold all of the hot water normally used in a brewing cycle plus the swollen tea. As previously mentioned, the hot beverage concentrate discharges through the off-centered discharge opening 36 at the bottom of the funnel into the selected reservoir 34.

Since the concentrate is relatively strong and not suited for normal consumption, it must be diluted. Solenoid control valves 106 and 108 FIGS. 4, 4A and 7) are disposed in water lines 95 and 96, respectively, to control the flow of dilution water into the selected one of the reservoirs 34. After concentrate has begun to flow from the funnel 22 into the selected reservoir 34, the solenoid control valve 106 or 108 which controls dilution water selected reservoir, is opened to allow tap water to flow into that reservoir so as to dilute and cool the concentrate. Using the left-hand reservoir 34 as viewed from the rear in FIGS. 1 and 5 as an example, solenoid valve 106 opens to allow the flow of diluting tap water from the manifold 94 into the water line 95 which extends to the flow director 42 mounted within the reservoir.

Referring to FIGS. 4 and 5, it will be seen that the outlet orifice 112 of the flow director 42 is oriented to discharge the incoming stream of diluting tap water against an adjacent side wall of the reservoir 34 in a fluid stream at an angle with respect to the side wall of less than or equal to 45°, preferably about 10°, and at a relatively small downward angle of about 22°. This orientation and arrangement reduces foaming of the beverage produced within the reservoir 34 and creates a swirling action which provides better mixing. The flow of dilution water continues until the predetermined quantity thereof has been introduced whereupon the electric control circuitry de-energizes and closes the solenoid valve 106 as will be described more fully below. In the interest of thorough mixing of the diluting water and beverage concentrate, the orifice 112 of each flow director 42 is sized so that the dilution water is discharged into reservoir 34 at a rate which allows substantially all of the beverage concentrate to flow from the funnel 22 before the solenoid valve 106 is de-energized and closed. The quantity of dilution water may be varied so as to vary the strength of the beverage produced and depends on the time interval that the solenoid valve 106 is energized and in the open condition. For tea, using a three gallon reservoir 34, two and one-half gallons of water are preferably added to cool and dilute one-half gallon of hot tea concentrate to the preferred strength at less than 100° F., which is suitable to add to a glass of ice for iced tea. After the dilution step is complete, the beverage within the selected reservoir is ready for dispensing, and the spent beverage-making material contained within the funnel 22 is discarded and the funnel reloaded with a fresh filter and quantity of unused beverage-making material and positioned to discharge from the orifice 36 into the other reservoir 34 for repetition of the foregoing brewing cycle.

The fluid flow lines in the system shown in FIGS. 4 and 7 may be modified for the addition of various elements 139, e.g. flow traps or the like, as may be required by local codes.

The electrical control system for controlling the cycling of the brewing apparatus 19 is schematically depicted in FIG. 9. Except for the manual loading of the funnel 22 with a fresh filter and a supply of beverage-forming material, the electrical control circuit in FIG. 9 provides for completely automatic operation of the brewing cycle. The circuit is adapted for connection to an outlet providing 120 volts A.C., 60 Hz, 15 amp., single phase, and provides continuous power to an internal heater 118 within the hot water tank 30, through a thermostat and switch combination 120 of known type and an overload cutout switch 122 of known type connected in series, and in parallel to an exterior blanket heater 124 on the tank 30 to help maintain the water at the correct temperature as described, for example, in Pat. No. 3,736,155 dated May 29, 1973.

Before energizing the remainder circuit by pressing the start switch 86 (FIGS. 1 and 5), the operator first moves the selector switch 84 to the right or left depending upon the reservoir 34 which is to be filled. The selector switch 84 is in series with the cam switches 38—38, which have been indicated in the circuit diagram in FIG. 9 as 38L and 38R to correspond to the switches activated when the funnel 22 is positioned over the left and right-hand reservoirs 34, respectively. These switches 38L and 38R control the energizing of the remainder of the circuit and thus the brewing cycle cannot start unless the funnel 22 is properly positioned over one of the reservoirs and the selector switch 84 has been moved to close the circuit for that particular reservoir. When either of the switches 38(L) or 38(R) is closed, power will be applied to both the single-stage timer 126 and the dual-stage timer 128.

As shown by the dashed lines in FIG. 9, the positioning of the selector switch 84 also has two other aspects, in addition to the interlock with the switches 38. The selector switch 84 in either of its positions at 84(a), closes a circuit to the dual-stage timer 128. At 84(b), the selector switch 84(b) connects into the circuit whichever of the dilution water control solenoid valves 106 or 108 that controls the flow of water to the selected reservoir 34.

With the single-stage timer 126 and dual-stage timer 128 both energized, a brewing cycle is actually started by momentarily depressing the start switch 86, which at 86(a) closes the circuit to trigger the single stage timer 126 and, at 86(b), closes the circuit to trigger the dual-stage timer 128. Both the single-stage timer 126 and the dual-stage timer 128 are standard electrical devices available from various manufacturers. When triggered, the single-stage timer 126 energizes the solenoid valve 90 which remains open for a predetermined period of time depending upon the setting of the single-stage timer thereby allowing a predetermined volume of tap water to be introduced into the bottom of the hot water tank 30.

When the dual-stage timer 128 is triggered, a predetermined period of time is allowed to lapse which is sufficient to delay the opening of the selected solenoid valve 106 or 108 until after a substantial portion of the beverage concentrate has discharged from the funnel 22 into the selected reservoir 34. After this predetermined period has elapsed, the dual-stage timer 128 will activate the selected solenoid valve 106 or 108 thereupon permitting the tap water to flow into the selected reservoir through the water line 95 or 96, respectively, to the appropriate flow director nozzle 42 for a predetermined period. It will be noted that the water delivery lines 92, 95 and 96 are equipped with flow controllers indicated diagrammatically at 141 and 142—142. These are known commercial devices that automatically regulate the flow of water through the respective lines at a predetermined value even though the pressure on the inlet sides thereof may vary somewhat within normal ranges. For example, flow controller 141 allows a flow of 0.175 gallon per minute while each of the flow controllers 142 allows a flow of 0.75 gallon per minute. Since the flow rate in each line 92, 95 and 96 is substantially constant when the respective valve 90, 106 or 108 therein is open, it will be seen that the period of time each of the valves is open determines the quantity of water allowed to flow therethrough during each brewing cycle.

Preferably, each reservoir 34 is equipped with a low level probe 114 (FIG. 9) and corresponding low level indicator lights 115R and 115L (FIGS. 1 and 9) glow when the liquid level in a reservoir reaches a predetermined low level so as to expose its low level probe and de-energize the circuit which includes a low level indicator switch 117 of known electronic type. A common probe 118 will be located in the bottom of each reservoir and preferably the low level probes are positioned so as to become exposed (non-submerged) when only one-half gallon of beverage remains in a reservoir.

Referring to FIG. 3, the single-stage timer board 130 for the single-stage timer 126 is mounted on one of the sidewalls of the upper cabinet 52 while the setting dial 131 therefor is mounted at the front of the cabinet so as to be readily accessible. Since the single-stage timer 126 operates to control the amount of hot water delivered to the spray head nozzle 32 and, in turn, controls the volume or amount of the beverage concentrate discharged from the funnel 22 into a reservoir 34, the single-stage timer 126 may also be referred to as the concentrate timer and the setting dial 131 may be referred to as the concentrate dial.

The dual stage timer board 132 for the dual stage timer 128 is mounted in the cabinet 52 on the opposite side from single-stage timer board 130 and the dials 133 and 134 are mounted so as to be readily accessible when the cover of the cabinet 52 is removed. The dial 133 controls or sets the delay period after the brewing cycle has started and before the solenoid valve 106 or 108 is opened to admit dilution water to a reservoir 34. Hence, the dial 133 may be referred to as the "delay" dial. The dial 134 controls or sets the period during which one of the solenoid valves 106 or 108 is open and dilution water is admitted to a reservoir 134 and, hence, is referred to as the "dilution" dial.

The switch and control thermostat 120 is also located within the cabinet 52 and is provided with a control knob 135 rotatable between a "low" and a "high" position so as to set the temperature at which the water within the hot water tank 30 is heated.

In the example mentioned above, wherein approximately 0.6 gallon of hot water is introduced into the brewing funnel during each cycle of operation and approximately two and one-half gallons of cold tap water for dilution are introduced into one of the reservoirs 34, the hot concentrated tea will start dripping from the funnel 22 within approximately 20 seconds after the start switch 86 has been depressed. Typically, the delay dial 133 is set so that a delay period of approximately eight minutes will occur before the dual-stage timer 128 operates to open one of the solenoid valves 106 or 108 so as to allow dilution water to flow into the appropriate reservoir 34. A dilution stream should stop approximately 15–30 seconds after the beverage concentrate has stopped dripping from the funnel 22. It will be understood that these times or other suitable times can be obtained by appropriate setting of the concentrate dial 131, the delay dial 133 and the dilution dial 134. The total brewing time between depression of the start switch 86 and shut-off of the dilution water is approximately 10.5 minutes in the example given above.

Figure 8:
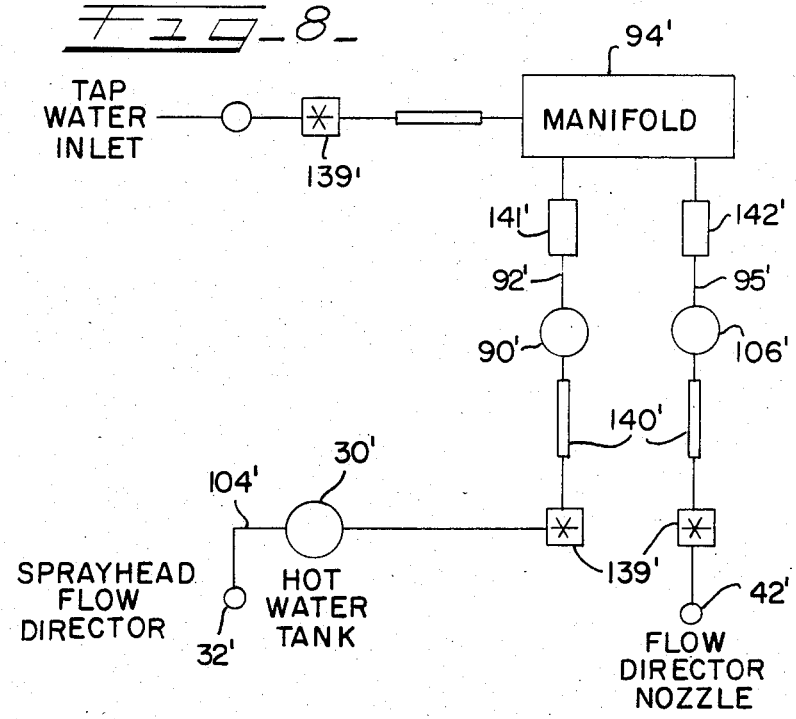
FIG. 8 is a schematic diagram of the fluid flow system embodied in the apparatus of FIG. 2.

As indicated above in connection with FIG. 2, brewing apparatus 20 embodying the present invention may be made with only a single reservoir, the fluid flow diagram and electric schematic for which are contained in FIGS. 8 and 10, respectively. The operation of a single reservoir brewer is substantially the same as that described above and the elements and components of the brewer 20 which are common to the dual reservoir brewer 19 have been indicated by corresponding prime numbers. Although the brewing funnel 22' for the brewer 20 is not rotatable, it may have a funnel position switch in series with an on-off switch 84'. In its "on" position, the selector switch energizes an indicator light. The start switch 86', as in the two-reservoir embodiment 20, begins the brewing cycle by energizing a single-stage timer switch 126' and a dual-stage timer 128' which, in the same sequence described above, operate to energize the solenoid valves 90' and 106'. Opening of solenoid valve 90' initiates or starts the period of steeping action when hot water is delivered to the spray head 32'. Subsequently, after the delay period the solenoid valve 106' opens and initiates the diluting water cycle when cold tap water is introduced into the reservoir 34'.

For ease of access in servicing the flow solenoid valves 90, 106 and 108 are mounted on a removable platform or support plate 136 (FIG. 4) which is accessible from the rear of the machine 19 by removing a suitable rear access panel. As indicated at 140—140 in FIG. 7, the water lines 92, 95 and 96 may be equipped with quick-removal couplings of known type to facilitate servicing. Likewise, as indicated at 140'—140' in FIG. 8, the water lines 92' and 95' may be equipped with quick-removal couplings.

If desired, the two-reservoir brewer 19 may be equipped with left and right indicator lights electrically interconnected with the angularly spaced contact switches 38 so as to indicate which of the reservoirs 34 is being utilized to make a fresh batch of beverage. However, since operators will readily learn how the funnel 22 should be positioned for brewing, the funnel position switches 38 can, as a practical matter, be dispensed with and the control circuit modified in an obvious manner.

It will be seen that the present invention provides a unique brewing apparatus particularly useful in commercial institutions for brewing large quantities of tea or similar beverages. Although it has been described in terms of the preferred and selective alternative embodiments, it is intended to include within the scope of this invention, as set forth in the following claims, those equivalent structures and features, some of which may be apparent upon reading this description, in others of which may be understood only after some study.

What is claimed is:

1. In beverage brewing apparatus comprising housing means including a base portion and an upper portion carried by and above said base portion, a hot water tank in said housing, water conduit means having an inlet adapted to be connected to a source of cold or cool water under pressure and a discharge end disposed in the lower portion of said hot water tank, a solenoid valve in said water conduit means, a timer switch electrically interconnected with said solenoid valve for opening the same for a predetermined period thereby allowing a predetermined quantity of cold or cool water to discharge into said hot water tank and displace an equal quantity of hot brewing water from the top thereof to a hot water dispensing port, and a beverage brewing receptacle carried by said upper portion beneath said dispensing port, the improvement comprising a pair of reservoirs carried by said base portion below and substantially on either side of said hot water dispensing port, said beverage brewing receptacle comprising an off-center liquid outlet and being pivotally mounted on said upper portion to permit the receptacle to be pivoted to position said outlet over either of said reservoirs to gravitationally discharge liquid beverage extract through said outlet into selected one of said reservoirs.

2. Beverage brewing apparatus in accordance with claim 1 further comprising control means for controlling the brewing cycle of said apparatus, said control means including sensor means to detect the proper positioning of said receptacle over one or the other of said reservoirs.

3. Beverage brewing apparatus in accordance with claim 2 wherein said sensor means comprise a pair of angularly spaced sensors, said receptacle including a tab portion for engaging one of said sensors when said receptacle is properly positioned over one of said reservoirs and engaging the other of said sensors when said receptacle is properly positioned over the other one of said reservoirs.

4. Beverage brewing apparatus in accordance with claim 2, further comprising a non-interchangeable removable cover over each of said reservoirs, each of said covers including opening means disposed within the cover to permit liquid to discharge from the receptacle into the reservoir, each of said covers further comprising upstanding stop means to block the receptacle from proper positioning over a reservoir which is covered by the cover associated with the other of said reservoirs.

5. Beverage brewing apparatus in accordance with claim 1 wherein said receptacle includes an annular rim, and said upper portion of said housing includes a pair of spaced slots to slideably and pivotally receive said receptacle.

6. Beverage brewing apparatus in accordance with claim 5 wherein said receptacle comprises a radially extending tab portion, said apparatus further comprising a pair of spaced switch actuator elements one of which is engageable by said tab when said receptacle is properly positioned over one of said reservoirs.

7. Beverage brewing apparatus in accordance with claim 6 further comprising a stop, carried by upper portion adjacent each of said switch actuators to engage said tab to prevent pivoting of said receptacle beyond said switch actuators 8. Beverage brewing apparatus in accordance with claim 1 wherein each of said reservoirs is of substantially greater volume than said predetermined quantity of water discharged into said hot water tank, and said apparatus further comprises dilution means to add selected quantities of water to each reservoir to dilute the liquid beverage extract received from the receptacle.

9. Beverage brewing apparatus in accordance with claim 8 wherein said dilution mean is timed to add dilution water after liquid beverage extract is received within said reservoir from the receptacle and to continue the addition of diluting water until after substantially all of the predetermined quantity of water has flowed through the receptacle.

10. Beverage brewing apparatus in accordance with claim 8 wherein said dilution means comprises means for directing the flow of dilution water against the side of each of said reservoirs.

11. Beverage brewing apparatus in accordance with claim 10 wherein said directing means comprises means for discharging water at an angle of less than or equal to 45° with respect to the wall of each reservoir.

12. Beverage brewing apparatus in accordance with claim 8 wherein the improvement further comprises second and third water conduit means each having an inlet adapted to be connected to a source of cold or cool water under pressure and each having a discharge end disposed in one of said reservoirs, second and third solenoid valves in said second and third water conduit means, respectively, a dual-stage timer switch electrically interconnected with each of said second and third solenoid valves for alternately opening one or the other thereof for a predetermined period following a preliminary period of delay after said first-mentioned solenoid valve has been opened, a selector switch electrically interconnected with said dual-stage timer switch for allowing the same to alternately energize one or the other of said second and third solenoid valves following said period of delay whereby each said second and third solenoid valves when open allows a predetermined quantity of cold or cool dilution water to flow into its respective reservoir.

13. Beverage brewing apparatus in accordance with claim 12 wherein said first-mentioned timer in said first-mentioned water conduit means is a single-stage timer switch and said single-stage timer switch and dual-stage timer switch are adjustable thereby permitting the periods during which said first-mentioned, second and third solenoid valves are opened to be adjusted and permitting said period of delay to be adjusted 14. Beverage brewing apparatus in accordance with claim 12 wherein said source of cold or cool water under pressure to which each of said first-mentioned, second and third water conduit means is connected is a manifold which, in turn, is connected to a source of cold or cool water under pressure.

15. Beverage making apparatus in accordance with claim 12 further comprising low level detector means carried by each of said reservoirs to detect when the liquid level therein falls to a selected low level, and signal means responsive to said low level detector means to produce a warning signal when said selected low level is reached.

16. Beverage brewing apparatus in accordance with claim 12 wherein each of said first-mentioned, second and third water conduit means includes a flow regulator whereby the quantity of water flowing therethrough when said first-mentioned, second and third solenoid valve therein is open is directly proportional to the time the respective solenoid valve is open.

17. Beverage brewing apparatus comprising:
a housing including means for supporting a brewing receptacle adapted to contain a quantity of dry beverage-making material;
means carried by said housing for conducting a selected quantity of water to the receptacle to make a liquid beverage concentrate;
a reservoir, including dispensing means, carried by said housing and disposed to receive beverage concentrate from the aforesaid receptacle, said reservoir having a volume substantially greater than said selected amount of water making the beverage concentrate;
dilution means in communication with said reservoir for adding a selected quantity of water to dilute the beverage concentrate to provide a beverage product for dispensing; and
flow control means operatively associated with said means for conducting said selected quantities of water to said receptacle and said reservoir, said flow control means comprising timer-controlled solenoid valve means.

18. Beverage brewing apparatus comprising:
a housing including means for supporting a brewing receptacle adapted to contain a quantity of dry beverage-making material;
means carried by said housing for conducting a selected quantity of water to the receptacle to make a liquid beverage concentrate;
a reservoir, including dispensing means, carried by said housing and disposed to receive beverage concentrate from the aforesaid receptacle, said reservoir having a volume substantially greater than said selected amount of water making the beverage concentrate;
dilution means in communication with said reservoir for adding a selected quantity of water to dilute the beverage concentrate to provide a beverage product for dispensing; and
flow control means operatively associated with said means for conducting a selected quantity of water to said receptacle and operatively associated with said dilution means to control the addition of dilution water to said reservoir, said flow control means including a first time-controlled solenoid valve and a single-state timer switch therefor operatively associated with said means for conducting a selected quantity of water to said receptacle, and a second timer-controlled solenoid valve and a dual-stage timer switch therefor operatively associated with said dilution means, actuation of said dual-stage timer switch delaying the addition of dilution water until after liquid beverage concentrate has commenced to flow from said brewing receptacle into said reservoir.

19. Beverage brewing apparatus in accordance with claim 18 wherein said dual-stage timer switch operates said second timer-controlled solenoid valve to continue the addition of dilution water to said reservoir until after substantially all of said liquid beverage concentrate is received in said reservoir.

20. Beverage making apparatus in accordance with claim 18 further comprising low level detector means carried by said reservoir to detect when the liquid level therein falls to a selected low level, and signal means responsive to said low level detector means to produce a warning signal when said selected low level is reached.

21. Beverage brewing apparatus in accordance with claim 18 wherein said dilution means includes means for directing the flow of diluting water against the wall of each of said reservoirs to reduce foaming and provide better mixing of the dilution water and concentrate.

22. Beverage brewing apparatus in accordance with 21 wherein said directing means is disposed to direct dilution water against a sidewall of said reservoir at an angle of less than or equal to 45°.

23. Beverage brewing apparatus comprising a housing including means for supporting a brewing receptacle having an off-center discharge port and being adapted to contain a quantity of dry beverage-making material;

means carried by said housing for conducting a selected quantity of water to the receptacle to make a liquid beverage concentrate; and a pair of adjacent reservoirs, including dispensing means, carried by said housing below said support means and disposed to receive beverage concentrate by gravitational discharge from the aforesaid receptacle, said support means for the receptacle permitting rotation of the receptacle so that the receptacle may be pivoted for discharge into selected one of said reservoirs, each of said reservoirs having a volume substantially greater than said selected amount of water provided by the beverage concentrate, and said apparatus further comprising dilution means in communication with each of said reservoirs for adding water thereto to dilute the beverage concentrate to provide a beverage product for dispensing, said means for conducting a selected quantity of water to said brewing receptacle including a first timer-controlled solenoid valve and a single-stage timer switch therefor, and said dilution means including second and third timer-controlled solenoid valves and a dual-stage timer switch therefor and operative therewith to alternately activate one or the other of said second or third timer-controlled solenoid valves so as to add diluting water to whichever of said reservoirs is receiving liquid beverage concentrate from said brewing receptacle.

24. Beverage brewing apparatus in accordance with claim 23 further comprising sensor means to sense the position of the receptacle supported by said housing.

25. Beverage brewing apparatus in accordance with claim 24 wherein said sensor means comprises a pair of spaced position detectors operable to detect when the receptacle is properly positioned over one or the other of said reservoirs.

26. Beverage brewing apparatus in accordance with claim 23 further comprising a non-interchangeable removable cover on each of said reservoirs with opening means therein for receiving concentrate from the receptacle, each of said covers including stop means disposed to prevent the receptacle from being positioned over a reservoir which is covered by the incorrect one of said covers.

27. Beverage brewing apparatus in accordance with claim 23 wherein said dilution means includes means for directing the flow of diluting water against the wall of each of said reservoirs to reduce foaming and provide better mixing of the dilution water and concentrate.

28. Beverage brewing apparatus in accordance with claim 27 wherein said directing means is disposed to direct dilution water against a sidewall of said reservoir at an angle of less than or equal to 45°.

29. Beverage brewing apparatus in accordance with claim 23 wherein said dilution means is adapted to continue the addition of dilution water until after substantially all of said beverage concentrate is received in said reservoir.

30. Beverage brewing apparatus in accordance with claim 23 wherein said single-stage timer and said dual-stage timer are adjustable, electrically interconnected, and adjusted so that on simultaneous activation of said timers said single-stage timer energizes said first timer-controlled solenoid valve and said dual-stage timer delays energization of the selected one of said second and third timer-controlled solenoid valves until after liquid beverage concentrate has commenced to flow from said brewing receptacle into the selected reservoir.

* * * * *